United States Patent [19]

Carberry et al.

[11] Patent Number: 5,578,946

[45] Date of Patent: Nov. 26, 1996

[54] INPUT SYNCHRONIZATION MECHANISM FOR INSIDE/OUTSIDE CLOCK

[75] Inventors: Richard A. Carberry; Bernard J. New, both of Los Gatos, Calif.

[73] Assignee: Xilinx, Inc., San Jose, Calif.

[21] Appl. No.: 539,982

[22] Filed: Oct. 6, 1995

[51] Int. Cl.[6] .................... H03K 19/096; H03K 19/177
[52] U.S. Cl. ................... 326/93; 326/96; 326/40; 327/144; 327/152
[58] Field of Search .................. 326/40, 41, 46, 326/93, 96, 97, 101, 82; 327/141, 144, 152, 153, 161

[56] References Cited

U.S. PATENT DOCUMENTS

| | | | |
|---|---|---|---|
| 4,648,105 | 3/1987 | Priebe et al. | 326/46 |
| 5,099,477 | 3/1992 | Taniguchi et al. | 327/144 |
| 5,454,116 | 9/1995 | Harigai et al. | 326/96 |
| 5,467,033 | 11/1995 | Yip et al. | 326/93 |
| 5,510,732 | 4/1996 | Sandhu | 326/97 |

OTHER PUBLICATIONS

"The Programmable Logic Data Book" copyright 1994, available from Xilinx, Inc., 2100 Logic Drive, San Jose, CA 95124.

*Primary Examiner*—Edward P. Westin
*Assistant Examiner*—Benjamin D. Driscoll
*Attorney, Agent, or Firm*—Jeanette S. Harms; Anthony C. Murabito

[57] ABSTRACT

A synchronization mechanism for synchronizing an outside clock with a delayed inside clock is provided. The delayed inside clock is distributed across a network of clock lines within the integrated circuit to deskew the clock signal at the supply points. Although the inside clock signal is deskewed, it is nevertheless delayed compared to an input clock signal provided by a pad of the integrated circuit. A distribution line provided on the periphery of the integrated circuit supplies an outside clock signal that is not substantially delayed compared to the input clock signal at the IC's pad. The synchronization mechanism provides synchronization between the outside clock, as received by an input/output block, and the inside clock. The synchronization is required because configurable logic blocks (CLBs) of the IC are typically referenced by the delayed inside clock. The IC can offer significantly reduced chip hold time on input data by referencing the outside clock while supplying data internally using the inside clock reference.

21 Claims, 6 Drawing Sheets

5,578,946

INPUT SYNCHRONIZATION MECHANISM FOR INSIDE/OUTSIDE CLOCK

BACKGROUND OF THE INVENTION

1. Field of the Invention

The present invention relates to the field of synchronization mechanisms within a clock network, and in particular to clock synchronization mechanisms for integrated circuit designs.

2. Description of the Related Art

FIG. 1 illustrates a clock distribution network 50 within an integrated circuit (IC) 20. A clock signal is supplied to network 50 via an external pad 10. Data is supplied via other external pads (not shown). In this case, network 50 branches out throughout IC 20 from a center point 55. Network 50, as is known in the art, functions to evenly supply the clock signal throughout IC 20 so that at supply points within network 50 the clock signals are supplied without skew. Skew is defined as the difference in delays between clock signals which results in a difference in arrival times. Network 50 and specifically the supply points within network 50 are determined so that the clock signal from pad 10 propagates along a relatively common distance from pad 10 to any supply point.

In this manner, the signal delay is roughly the same between the reference clock signal at pad 10 and any supply point in network 50. Network 50 is said to "deskew" the clock, and the clock signal obtained at any point along network 50 is said to be "deskewed." In accordance with the above, clock signals obtained from any two supply points along network 50 should have marginal or negligible skew between them.

Although the clock signal from network 50 is "deskewed" relative to any two supply points, the deskewed signal is nevertheless delayed relative to the input clock signal seen at pad 10. For instance, although an input/output block (IOB) 15 is placed relatively close to pad 10, IOB 15 nevertheless does not receive the clock signal over network 50 until the signal propagates through length 50a (half of the chip length), through length 50b (roughly half of the chip length), through length 50c (roughly half of the chip length) and through length 50d. Each length introduces signal delay relative to the clock signal seen at pad 10.

This clock delay can be problematic for circuits such as IOB 15. As is known in the art, IOBs interface with input and output pads of IC 20 and route signals to or from other internal circuitry of the chip. In some cases, it is desirable for IOB 15 to receive the input clock signal without delay relative to pad 10. For instance, in some cases it is desired to reduce the chip hold time on input data so as to efficiently interface with external systems that supply data. Data delay is typically used to eliminate such hold times. However, manufacturing uncertainties require excessive delay to compensate for worst case delays and increases set-up times unnecessarily. Minimizing clock distribution delay minimizes this compensating delay, thereby reducing the uncertainty and the ill-effects of worst case delays.

Therefore, a need arises for a mechanism allowing certain circuitry within an IC to receive a clock signal with negligible delay relative to the input signal at the clock pad. Moreover, a need arises for a mechanism allowing the certain circuitry to interface with other IC elements that use a standard delayed clock. The present invention provides the above advantageous functionalities.

SUMMARY OF THE INVENTION

The mechanism of the present invention is operable within an integrated circuit (IC) having an inside clock that is delayed by distribution across a network of clock lines within the integrated circuit to deskew the clock signal at the supply points. Although the inside clock signal is deskewed, it is nevertheless delayed with respect to an input clock signal at the IC's pad. The delay is associated with propagation of the inside clock signal from the IC's pad through the distribution network to the supply point. In cases when it is required to obtain the clock signal with minimal delay, another clock distribution line is provided along an edge of the IC. This distribution line supplies an outside clock signal that is not significantly delayed compared to the input clock signal at the IC's pad.

In accordance with the present invention, a circuit provides synchronization between a signal that is synchronous to the outside clock, as received by an input/output block (IOB), and an inside clock signal. The synchronization is required because configurable logic blocks (CLBs) of the IC are typically driven by the inside clock. In this manner, an IC in accordance with the present invention significantly reduces chip hold time on input data signals by referencing the outside clock while supplying data internally using the inside clock reference. The present invention includes a first circuit for latching an input data signal in synchronization with the outside clock signal and providing a first data. In one embodiment, a second circuit provides second data by latching the first data in synchronization with the inside clock signal. In this embodiment, the present invention further includes a plurality of configurable logic devices synchronized to the inside clock, wherein one of the plurality of configurable logic devices is coupled to receive the second data.

In one embodiment of the present invention, the first circuit is a transparent latch, the delayed clock distribution network is disposed throughout the integrated circuit, and the second circuit is a D flip-flop circuit. In this embodiment, a first multiplexer selectively provides the input data signal or the first delayed data signal to the latch. A second multiplexer selectively provides the input data signal, the second delayed data signal, or the output signal of the latch to the flip flop. In this embodiment, the present invention further includes a third multiplexer which selectively provides an output signal of the flip flop or the input data signal.

In another embodiment, a first multiplexer selectively provides a first delayed data signal, a second delayed data signal, or the input data signal to a flip flop. The flip flop receives its input signal from the first multiplexer and provides an output signal to a latch. The flip flop and latch are clocked by the outside and inside clock signals, respectively. This IOB configuration provides substantially the same functionality as the previously-described embodiment.

DETAILED DESCRIPTION OF THE DRAWINGS

Figure 1:
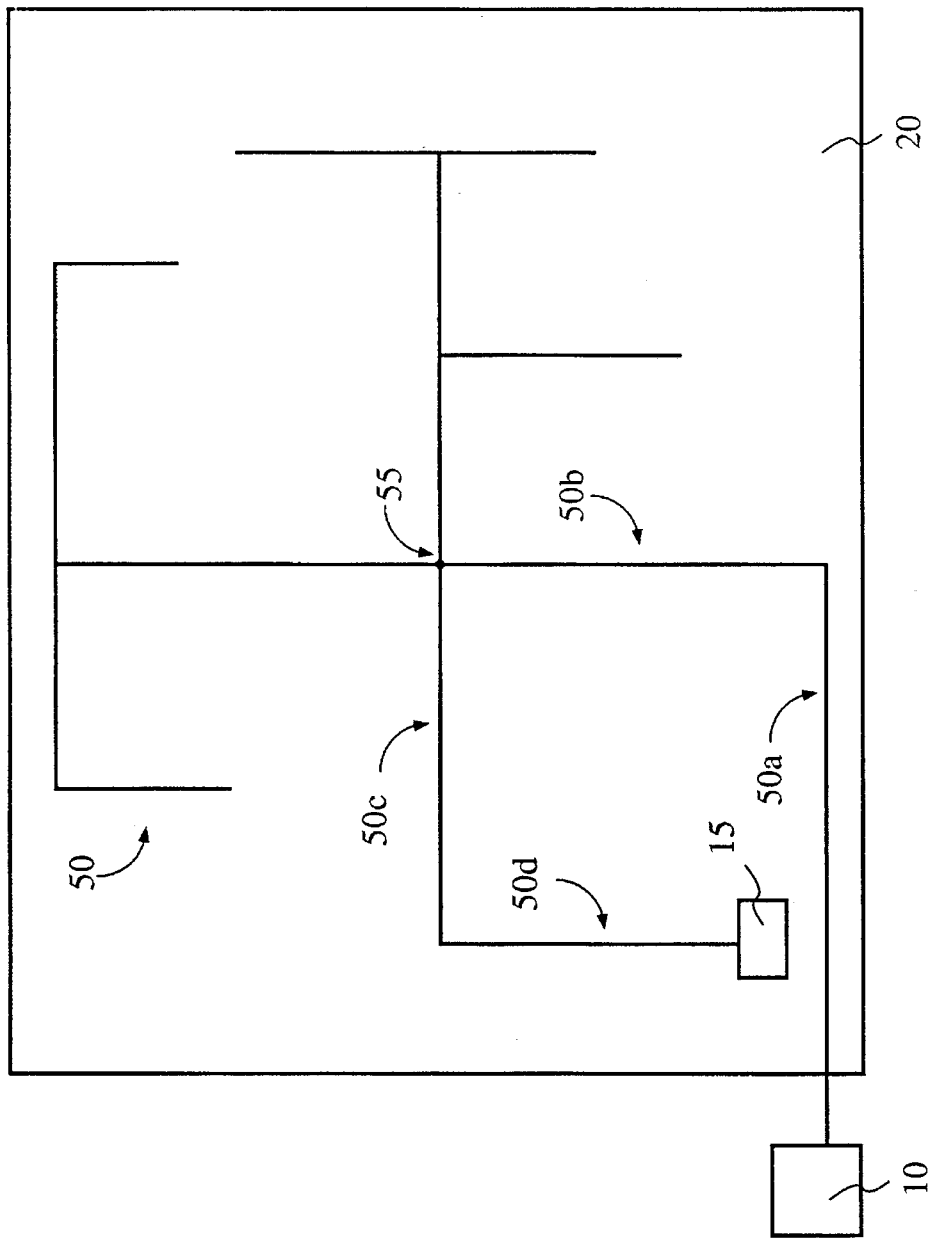
FIG. 1 illustrates a prior art integrated circuit design using a clock deskew network.
Figure 2:
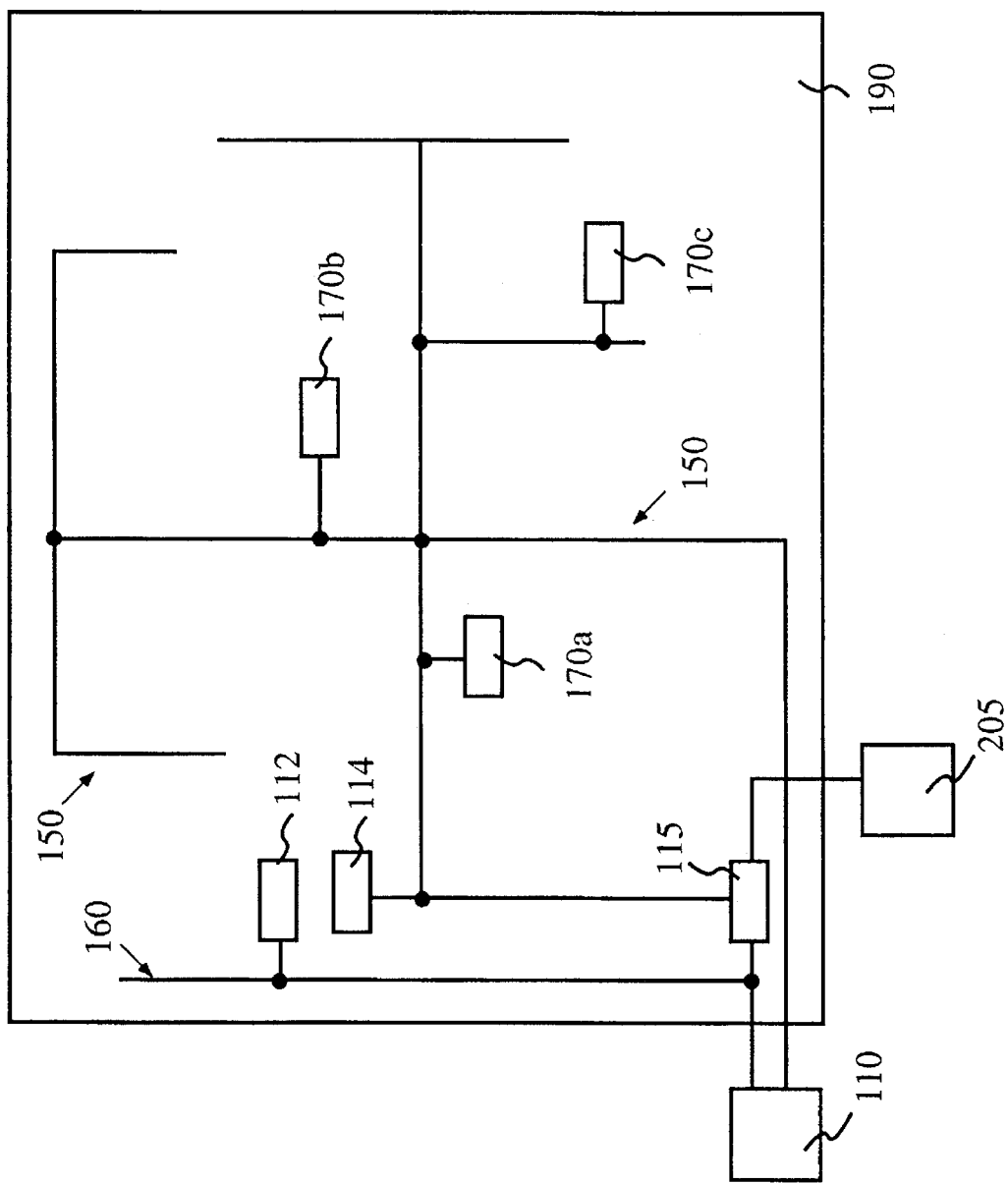
FIG. 2 shows a clock distribution mechanism of the present invention using a delayed inside clock distribution network and an outside clock distribution network.

FIG. 2 illustrates a clock distribution system utilized by the present invention. Integrated circuit (IC) 190 is shown with an exemplary clock distribution network 150 similar to the distribution system of network 50 (FIG. 1). Specifically, a network 150 deskews but delays the clock signal relative to the signal from pad 110. The signal supplied via network 150 is called the inside (or deskewed or delayed) clock signal because it clocks the elements "inside" IC 190. Note that network 150 is exemplary only, wherein any number of well known clock distribution networks can be used in accordance with the present invention in lieu of network 150 to effectively supply the inside clock signal.

The inside clock signal is supplied along the supply points of network 150. Exemplary supply points include configurable logic blocks (CLBs) 170a, 170b, and 170c that comprise clocked elements such as flip-flops, latches, or random access memories (RAMs). Note that any type of well known CLBs can operate within the scope of the present invention. The 1994 Xilinx Data Book, pages 2–9 to 2–20 which are incorporated by reference herein, describes CLBs in greater detail. In clock distribution network 150, the clock signal skew is negligible between the clock signals supplied to CLBs 170a, 170b and 170c from network 150. However, there is a propagation delay between the clock signals supplied to these CLBs and the clock signal at pad 110.

In accordance with the present invention, IC 190 includes a second clock distribution network 160. This network 160 is also coupled to pad 110, but runs along the periphery or "edge" of IC 190 and therefore is called the outside (or early) clock distribution network. The clock signal supplied by network 160 is called the "edge" or "outside" clock signal. Because network 160 is close to pad 110, the clock delay between clock signals seen over the supply points of network 160 and the input clock signal seen at pad 110 is negligible.

In typical applications, IOBs are placed along the periphery of IC 190. Therefore, in accordance with the present invention, IOBs can readily receive the outside clock signal over network 160. Within a programmable IC, such as a field programmable gate array (FPGA), a given IOB can be programmably coupled to either network 160 (as shown by IOB 112), or network 150 (as shown by IOB 114), or to both networks (as shown by IOB 115). In this embodiment, IOB 115 is also coupled to external pad 205 for receiving data signals. Note that similar pads coupled to IOBs 112 and 114 are not shown for simplicity.

As described in detail below, IOB 115 utilizes the outside clock signals supplied via network 160 to receive input data from pad 205. However, IOB 115 utilizes the inside clock signal supplied via network 150 to synchronize the received data to other elements of IC 190 (e.g., CLBs 170a, 170b, and 170c) that reference the delayed clock from network 150. In this manner, IOB 115 provides a very low or negligible hold time and minimum set-up times for input data supplied over pad 205 but nevertheless efficiently interfaces with the other elements of IC 190 that reference the inside clock from network 150. Thus, in accordance with the present invention, IOB 115 provides a simple interface that synchronizes data received externally via pad 205 to the internal clock.

Figure 4:
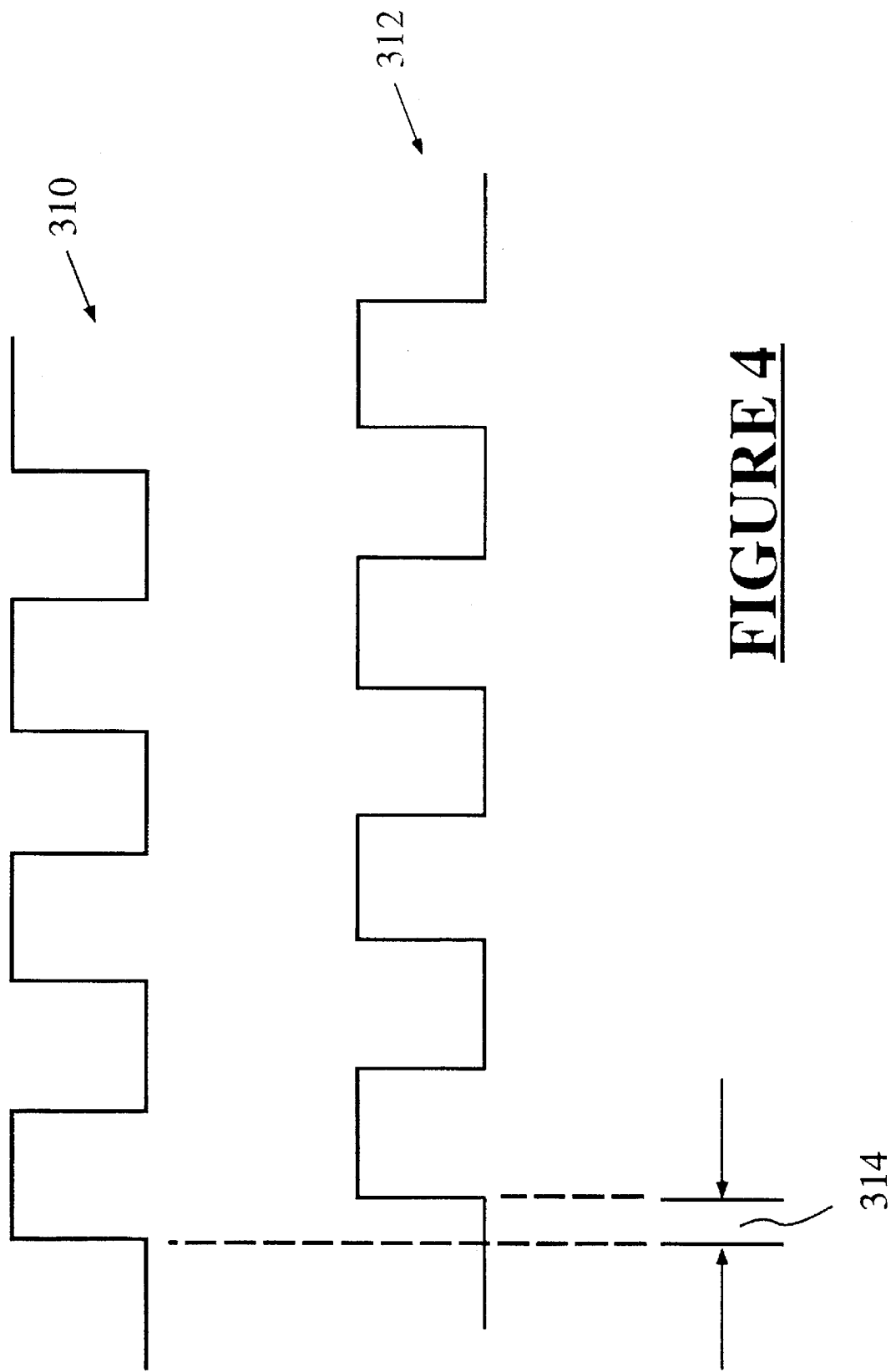
FIG. 4 is a timing diagram illustrating delay between the inside clock and the outside clock of the present invention.

FIG. 4 is a timing diagram illustrating the difference between an outside clock signal 310 and an inside clock signal 312. As shown in FIG. 4, outside clock signal 310 arrives slightly early compared to inside clock signal 312. The time interval between the rising edges of signals 310 and 312 is called the skew 314. The relative magnitude of skew 314 as shown in FIG. 4 is for purposes of illustration and is exemplary. The present invention provides a mechanism for synchronizing data synchronous with the clock providing clock signal 312 and with the clock providing clock signal 310.

Figure 3:
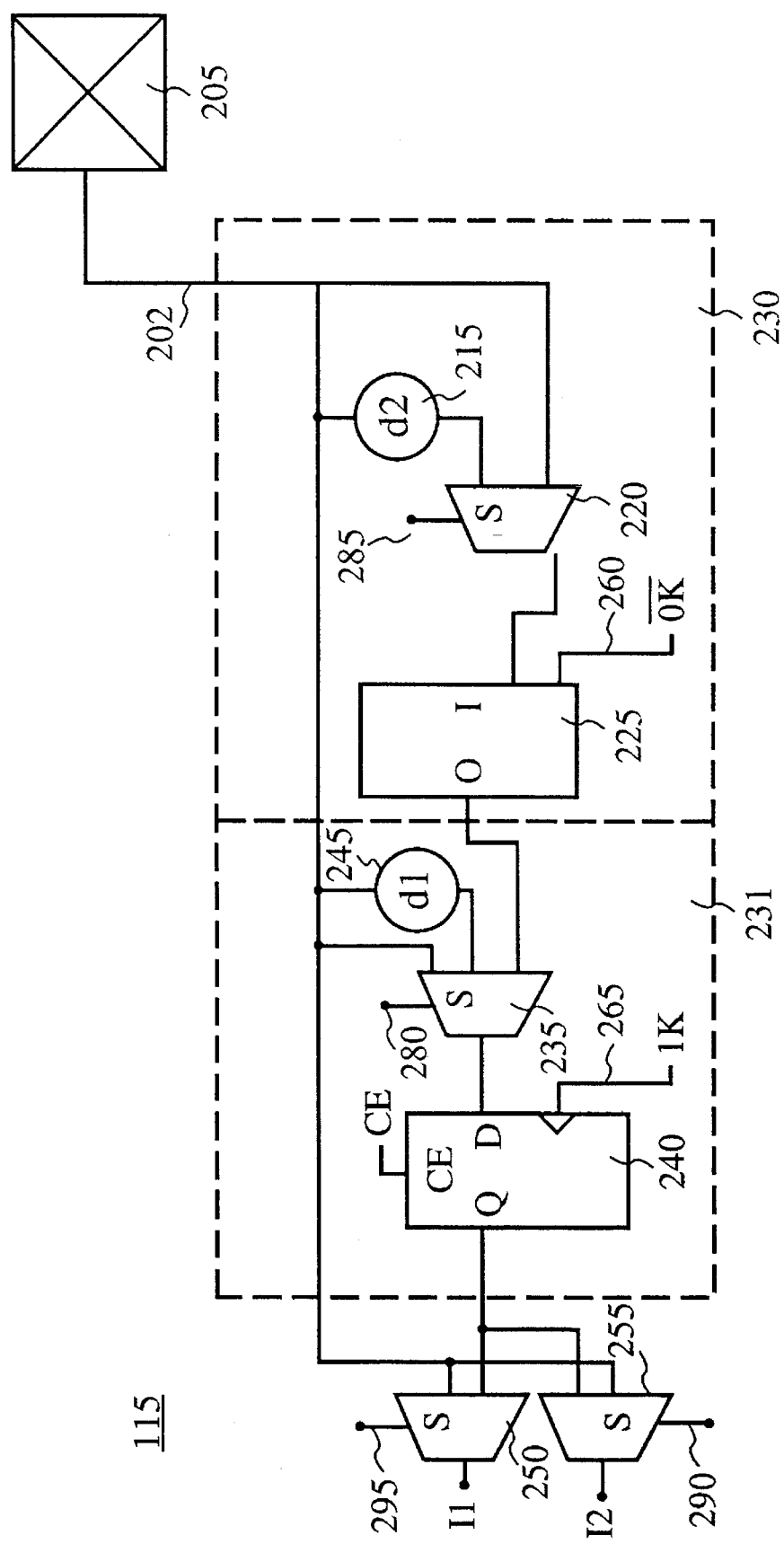
FIG. 3 illustrates a synchronization circuit utilized by an embodiment of the present invention that can be used within an input/output block (IOB) of an integrated circuit.

FIG. 3 illustrates IOB 115 coupled to pad 205 via a data line 202. Input data over data line 202 is supplied to a delay circuit 215 that delays the data a predetermined amount of time, i.e. delay d2, and provides an input signal to a multiplexer 220. The data on data line 202 is also provided to multiplexer 220. Multiplexer 220 includes a select line 285 that is coupled to a programmable memory cell (not shown) to provide programmable selection between the output signal of delay unit 215 and data line 202. Multiplexer 220 provides a signal to the input terminal I of a transparent latch circuit (hereinafter latch) 225. Upon the clock signal on line 260 (e.g., OK (bar)) going high, the data stored on input terminal I is transferred to the output terminal O of latch 225. If the signal on line 260 remains low, the signal on the output terminal O is frozen and does not respond to the data signal on the input terminal I of latch 225.

A number of clock signals can be selected and provided on line 260 to drive latch 225. In accordance with the present invention, outside clock signal 310 (FIG. 4) of network 160 is inverted and provided on line 260. This inverted outside clock signal is labeled "OK(bar)". Thus, by using the outside clock OK, circuit 230 latches input data into IOB circuit 115 using substantially the same clock signal as the clock signal provided by input pad 110 (FIG. 2).

Delay d2 compensates for the propagation delay (if any) associated with the outside clock signal from pad 110 (not shown in FIG. 3) to the clock terminal of latch 225. In this manner, if multiplexer 220 is programmed to select the output signal of delay circuit 215, the present invention ensures that the next-cycle-data signal over data line 202 does not arrive before the clock edge of the outside clock provided on line 260, but rather arrives simultaneously with or just after the slightly delayed outside clock edge. Note that the value of delay d2 is set when the IC is designed, and in one embodiment is set between 1 and 5 nanoseconds. The direct path from pad 205 to multiplexer 220 is provided to minimize delay when knowledge of the external data signal guarantees that next clock data will not become available before the clock edge in spite of any delay in outside clock signal OK.

Multiplexer 235 receives a first input signal from the output terminal O of latch 225, a second input signal from data line 202, and a third input signal from a delay circuit 245. Delay circuit 245 receives its input signal from data line 202 and adds a delay, d1, to the data signals on data line 202. Delay circuit 245 serves an analogous function as delay circuit 215. Specifically, delay d1 compensates for the propagation delay (if any) associated with the inside clock signal from pad 110 (FIG. 2) to the clock terminal of flip flop 240. Similarly to delay d2, the value of delay d1 is chosen when the IC is designed, and in one embodiment is set between 1 and 5 nanoseconds. The select line 280 for multiplexer 235 is coupled to a programmable memory cell such as an SRAM (not shown), for selection configuration.

Flip flop 240, via its D input terminal, receives the output signal of multiplexer 235. Flip flop 240 also receives a chip enable (CE) input signal as well as a clock signal on line 265. The 1194 Xilinx Data Book, pages 2–19 to 2–20, previously incorporated by reference, describes the functioning of multiplexer 235 and flip flop 240 in greater detail. Because other circuitry of IC 190 is synchronous to the inside clock signal IK, the present invention utilizes flip flop 240 to synchronize the input data to the inside clock. Specifically, inside clock signal 312 (FIG. 4) of network 150 is provided on line 265 and is labeled "IK." Therefore, if multiplexer 235 selects the output signal of latch 225, that data signal is synchronized to the internal clock signal by flip flop 240.

Multiplexers 250 and 255 are programmed to selectively transfer either the signal on the Q output terminal of flip flop 240 or the signal on data line 202. Select lines 295 and 255 of multiplexers 250 and 255 are individually coupled to programmable memory cells (not shown) for selection configuration. Multiplexer 250 provides an output signal I1, whereas multiplexer 255 provides an output signal I2.

By advantageously placing the internal clock synchronization logic 231 within IOB 115, the present invention eliminates the need to place such circuitry within each CLB of IC 190. The IOB 115 of the present invention (1) receives data clocked at substantially the same clock signal as seen at pad 110 (e.g., with negligible skew) so that external devices are not held up by IC 190 while at the same time (2) supplies that data synchronized with the delayed inside clock for internal computations.

Figure 5:
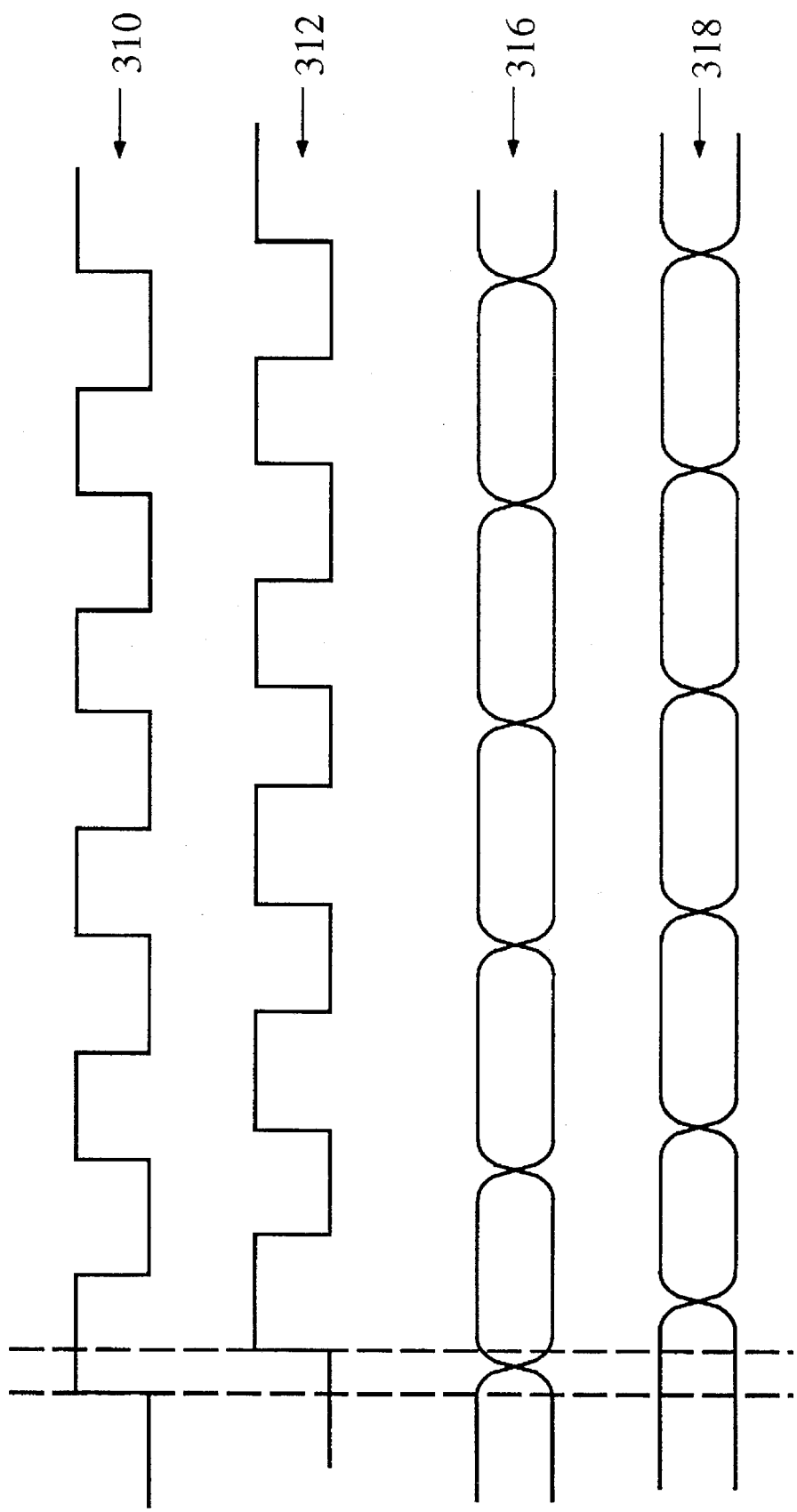
FIG. 5 is a timing diagram illustrating timing relationships between clock signals and data signal referenced by the outside clock and the delayed inside clock.

FIG. 5 illustrates the timing relationship between outside clock 310, inside clock 312, the signals 316 on data line 202 (FIG. 3), and the signals 318 (i.e. output signals I1 or I2 of IOB 115). Note that signals 316 of data line 202 are synchronized to outside clock 310, whereas signals 318 are synchronized to inside clock 312. Therefore, as shown by FIGS. 3 and 5, the present invention ensures a very low chip hold time and minimum set-up time for the input data and provides a simple interface with external pads providing clock and data signals.

In other embodiments of the present invention, line 265 provides the outside clock OK. In such case, IOB 115 strictly synchronizes to outside clock OK and does not provide synchronization to the internal clock IK. In such embodiments, the internal clock synchronization is included within the CLBs of IC 190.

Figure 6:
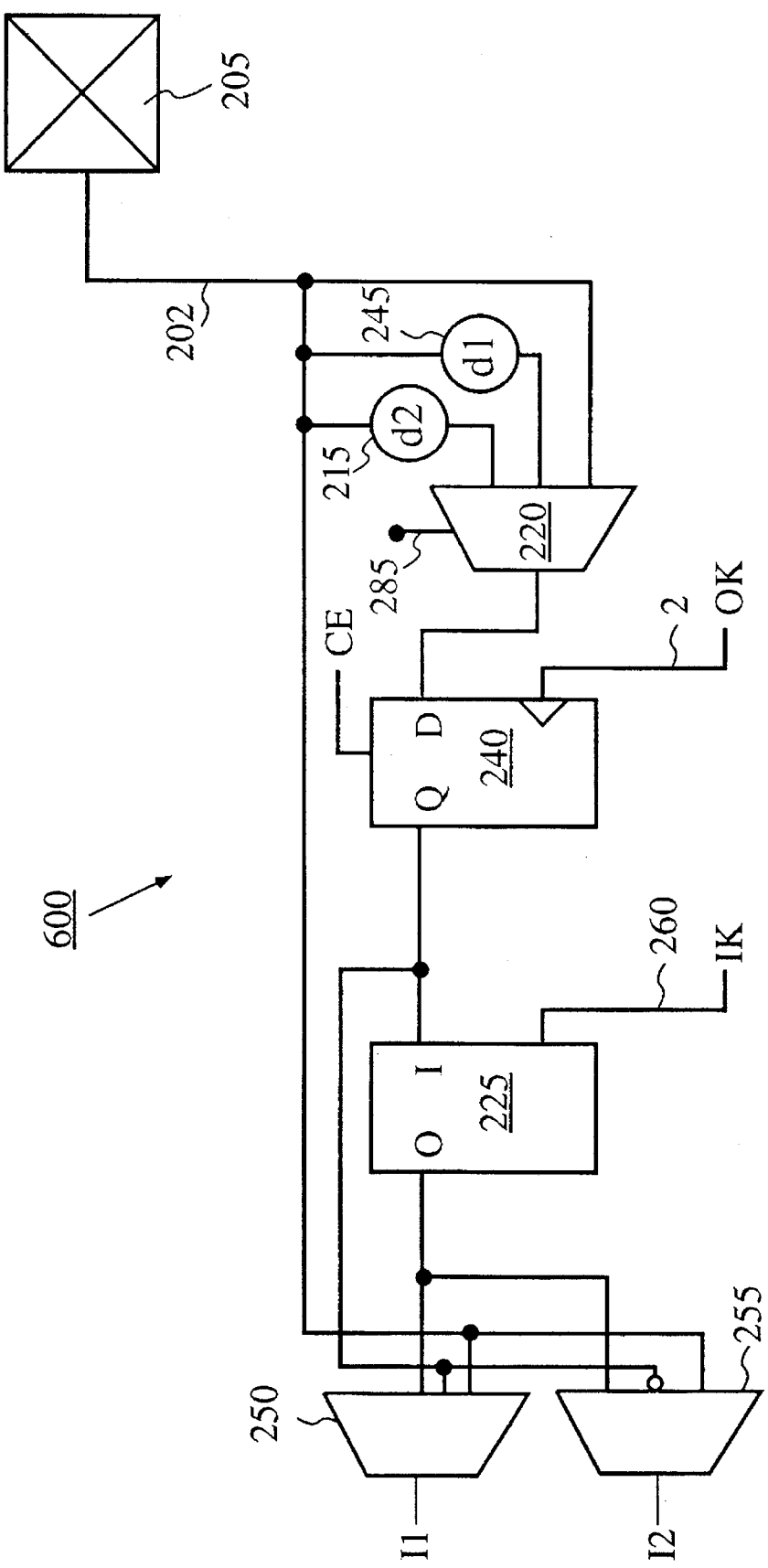
FIG. 6 shows another embodiment of a synchronization circuit of the present invention.

In yet another embodiment of the present invention, shown in FIG. 6, multiplexer 220 receives input signals from delay circuit 245, delay circuit 215, and data line 202. Flip flop 240 receives its input signal from multiplexer 220 and provides an output signal to latch 225 that delays data changes at the IOB output terminal until after the rising edge of inside clock signal IK. IOB 600 provides substantially the same functionality as IOB 115.

In the above detailed description, numerous specific details are set forth in order to provide a thorough understanding of the present invention. However, those skilled in the art will recognize that other embodiments of the present invention are covered by the attached claims.

What is claimed is:

1. An integrated circuit comprising:

a clock pad for receiving an input clock signal;

a data pad for receiving an input data signal;

a delayed clock distribution network coupled to receive said input clock signal and for supplying an inside clock that is delayed with reference to said input clock signal;

an early clock distribution network disposed along a periphery of said integrated circuit and coupled to receive said input clock signal and for supplying an outside clock that is not substantially delayed with reference to said input clock signal;

a first circuit coupled to receive said input data signal and coupled to receive said outside clock, said first circuit latching said input data signal in synchronization with said outside clock; and a second circuit coupled to receive an output signal of said first circuit and coupled to receive said inside clock, said second circuit latching said first data in synchronization with said inside clock.

2. An integrated circuit as described in claim 1 wherein said first circuit is a transparent latch circuit.

3. An integrated circuit as described in claim 1 wherein said second circuit is a D flip flop circuit.

4. An integrated circuit as described in claim 1 wherein said first circuit is a D flip flop circuit.

5. An integrated circuit as described in claim 1 wherein said second circuit is a transparent latch circuit.

6. An integrated circuit as described in claim 1 further comprising a plurality of configurable logic devices synchronized to said inside clock, one of said plurality of configurable logic devices coupled to receive an output signal of said second circuit.

7. An integrated circuit as described in claim 1 further comprising:

a first multiplexer receiving said input data signal and receiving a first delayed data signal representing said input data signal but delayed by a first delay amount, said first multiplexer coupled to supply to said first circuit a signal from a set of signals comprising said input data signal and said first delayed data signal.

8. An integrated circuit as described in claim 7 further comprising:

a second multiplexer receiving said input data signal and receiving a second delayed data signal representing said input data signal but delayed by a second delay amount, said second multiplexer coupled to supply to said second circuit a signal from a set of signals comprising said input data signal, said second delayed data signal, and said output signal of said first circuit.

9. An integrated circuit as described in claim 8 further comprising a third multiplexer for supplying an output signal from a set of signals comprising an output signal of said second circuit and said input data signal.

10. An integrated circuit as described in claim 1 further comprising:

a first multiplexer receiving said input data signal, a first delayed data signal representing said input data signal but delayed by a first delay amount, and a second delayed data signal representing said input data signal but delayed by a second delay amount, said first multiplexer coupled to supply to said first circuit a signal from a set of signals comprising said input data signal, said first delayed data signal, and said second delayed data signal.

11. An integrated circuit (IC) comprising:

means for providing an input clock signal and an input data signal;

a delayed clock distribution network coupled to receive said input clock signal and for supplying an inside clock that is delayed with reference to said input clock signal;

an early clock distribution network disposed along a periphery of said IC and coupled to receive said input clock signal and for supplying an outside clock that is not substantially delayed with reference to said input clock signal;

a first circuit for reducing IC set-up and hold times associated with said input data signals, said first circuit coupled to receive said input data signal and coupled to receive said outside clock, said first circuit providing a first data and latching said input data signals in synchronization with said outside clock; and a second circuit for synchronizing said first data to said inside clock, said second circuit coupled to receive an output signal of said first circuit and said inside clock, said second circuit providing second data by latching said first data in synchronization with said inside clock.

12. An integrated circuit as described in claim 11 wherein said first circuit is a transparent latch circuit.

13. An integrated circuit as described in claim 11 wherein said second circuit is a D flip-flop circuit.

14. An integrated circuit as described in claim 11 wherein said first circuit is a D flip-flop circuit.

15. An integrated circuit as described in claim 11 wherein said second circuit is a transparent latch circuit.

16. An integrated circuit as described in claim 11 further comprising a plurality of configurable logic devices synchronized to said inside clock, one of said plurality of configurable logic devices coupled to receive an output signal of said second circuit.

17. An integrated circuit as described in claim 11 further comprising:

a first multiplexer receiving said input data signal and receiving a first delayed data signal representing said input data signal but delayed by a first delay amount, said first multiplexer coupled to supply to said first circuit a signal from a set of signals comprising said input data signal and said first delayed data signal.

18. An integrated circuit as described in claim 17 further comprising:

a second multiplexer receiving said input data signal and receiving a second delayed data signal representing said input data signal but delayed by a second delay amount, said second multiplexer coupled to supply to said second circuit a signal of a set of signals comprising said input data signal, said second delayed data signal, and said output signal of said first circuit.

19. An integrated circuit as described in claim 18 further comprising a third multiplexer for supplying an output signal from a set of signals comprising an output signal of said second circuit and said input data signal.

20. An integrated circuit as described in claim 11 further comprising:

a first multiplexer receiving said input data signal, a first delayed data signal representing said input data signal but delayed by a first delay amount, and a second delayed data signal representing said input data signal but delayed by a second delay amount, said first multiplexer coupled to supply to said first circuit a signal from a set of signals comprising said input data signal, said first delayed data signal, and said second delayed data signal.

21. A method of synchronizing signals for an integrated circuit interface comprising:

receiving an input clock signal;

supplying an inside clock that is delayed with reference to said input clock signal;

supplying an outside clock that is not substantially delayed with reference to said input clock signal;

providing a first circuit which receives an input data signal and said outside clock, wherein said first circuit latches said input data signal in synchronization with said outside clock; and providing a second circuit which receives an output signal of said first circuit and said inside clock, wherein said second circuit latches said first data in synchronization with said inside clock.

* * * * *